US012558676B2

(12) United States Patent
Lew et al.

(10) Patent No.: US 12,558,676 B2
(45) Date of Patent: Feb. 24, 2026

(54) METHOD FOR PREPARING SMALL CRYSTAL SSZ-81 ZEOLITE

(71) Applicant: CHEVRON U.S.A. INC., San Ramon, CA (US)

(72) Inventors: Christopher Michael Lew, Alameda, CA (US); Rebecca Edyne Maclean, Pleasanton, CA (US); Kurt Owen Jensen, Richmond, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 503 days.

(21) Appl. No.: 18/177,309

(22) Filed: Mar. 2, 2023

(65) Prior Publication Data

US 2024/0299917 A1 Sep. 12, 2024

(51) Int. Cl.

| | |
|---|---|
| ***B01J 29/70*** | (2006.01) |
| ***B01J 35/40*** | (2024.01) |
| ***B01J 37/00*** | (2006.01) |
| ***B01J 37/03*** | (2006.01) |
| ***B01J 37/04*** | (2006.01) |
| ***C01B 39/48*** | (2006.01) |

(52) U.S. Cl.

CPC ............... *B01J 29/70* (2013.01); *B01J 35/40* (2024.01); *B01J 37/0018* (2013.01); *B01J 37/031* (2013.01); *B01J 37/04* (2013.01); *C01B 39/48* (2013.01); *C01P 2002/60* (2013.01); *C01P 2002/72* (2013.01); *C01P 2004/03* (2013.01)

(58) Field of Classification Search

CPC ........ B01J 29/70; B01J 35/40; B01J 37/0018; B01J 37/031; B01J 37/04; C01B 39/48; C01P 2002/60; C01P 2002/72; C01P 2004/03

See application file for complete search history.

(56) References Cited

U.S. PATENT DOCUMENTS

| | | | | |
|---|---|---|---|---|
| 8,540,963 | B2 | 9/2013 | Zones et al. | |
| 8,545,798 | B2 | 10/2013 | Zones et al. | |
| 8,546,628 | B2 | 10/2013 | Chen et al. | |
| 2012/0114553 | A1* | 5/2012 | Zones | C01B 39/48 423/706 |
| 2015/0158020 | A1* | 6/2015 | Nicholas | C07D 471/10 546/186 |
| 2020/0048102 | A1* | 2/2020 | Nicolas | B01J 19/1812 |

OTHER PUBLICATIONS

A. Jackowski, S.I. Zones, K. Chaudhuri, H.S.Lacheen and S.W. Yeh "A hydrothermal synthesis of a 2-dimensional layered silicate followed by a transition to a 3-dimensional aluminosilicate zeolite" Micropor. Mesopor. Mater. 2014, 197, 33-39.

* cited by examiner

*Primary Examiner* — Paul A Wartalowicz
*Assistant Examiner* — Slone Elizabeth Simkins

(57) ABSTRACT

A method is disclosed for producing small crystal forms of zeolite SSZ-81. The method includes forming a reaction mixture containing an alumina-coated silica sol, a source of an alkali metal, a structure directing agent containing 1,5-bis(N-methylpiperidinium)pentane dications and/or 1,5-bis(1-azonia-bicyclo[2.2.2]octane)pentane dications, a source of hydroxide ions, and water; and subjecting the reaction mixture to crystallization conditions sufficient to form crystals of the zeolite. The compositions made according to that method, as well as the various uses of the compositions, are also disclosed.

7 Claims, 3 Drawing Sheets

METHOD FOR PREPARING SMALL CRYSTAL SSZ-81 ZEOLITE

FIELD

This invention relates to small crystal size SSZ-81 zeolite, its synthesis and its use as an adsorbent and a catalyst for organic conversion reactions.

BACKGROUND

Crystalline zeolite SSZ-81, and its conventional preparation using 1,5-bis(1-azonia-bicyclo[2.2.2]octane)pentane dications and/or 1,5-bis(1,4-diazabicyclo[2.2.2]octane)pentane dications as a structure directing agent, are taught by U.S. Pat. Nos. 8,540,963 and 8,545,798. Conventional SSZ-81 has a distinctive X-ray diffraction pattern which distinguishes it from other known crystalline materials and can be used as a catalyst in certain organic conversion reactions.

Conventional crystallization of an SSZ-81 reaction mixture produces crystals of about 500 nanometers in size. Such large crystals inherently have slower diffusion. For chemical reactions where diffusivity is critical, having a smaller crystal size provides a shorter diffusion path and therefore, enhances the mass transfer, improving the desired reaction pathways with a positive impact on the selectivity and conversion of such reactions.

According to the present disclosure, small crystal forms of zeolite SSZ-81 can be synthesized using alumina-coated silica sols in the presence of a structure directing agent comprising 1,5-bis(N-methylpiperidinium)pentane dications and/or 1,5-bis(1-azonia-bicyclo[2.2.2]octane)pentane dications.

SUMMARY

In one aspect, there is provided a zeolite having a framework structure of SSZ-81 and having a d50 crystal size of 250 nanometers or less.

In another aspect, there is provided a method of making a zeolite having a framework structure of SSZ-81. The method comprises: (1) forming a reaction mixture comprising: (a) an alumina-coated silica sol; (b) a source of an alkali metal [M]; (c) a structure directing agent [Q] comprising one or more of 1,5-bis(N-methylpiperidinium)pentane dications and 1,5-bis(1-azonia-bicyclo[2.2.2]octane)pentane dications; (d) a source of hydroxide ions; and (e) water; and (2) subjecting the reaction mixture to crystallization conditions sufficient to form crystals of the zeolite.

In a further aspect, there is provided a process for converting a feedstock comprising an organic compound to a conversion product which comprises contacting the feedstock at organic compound conversion conditions with a catalyst, the catalyst comprising a zeolite having a framework structure of SSZ-81 and having a d50 crystal size of 250 nanometers or less.

DETAILED DESCRIPTION

Definitions

Figure 1:
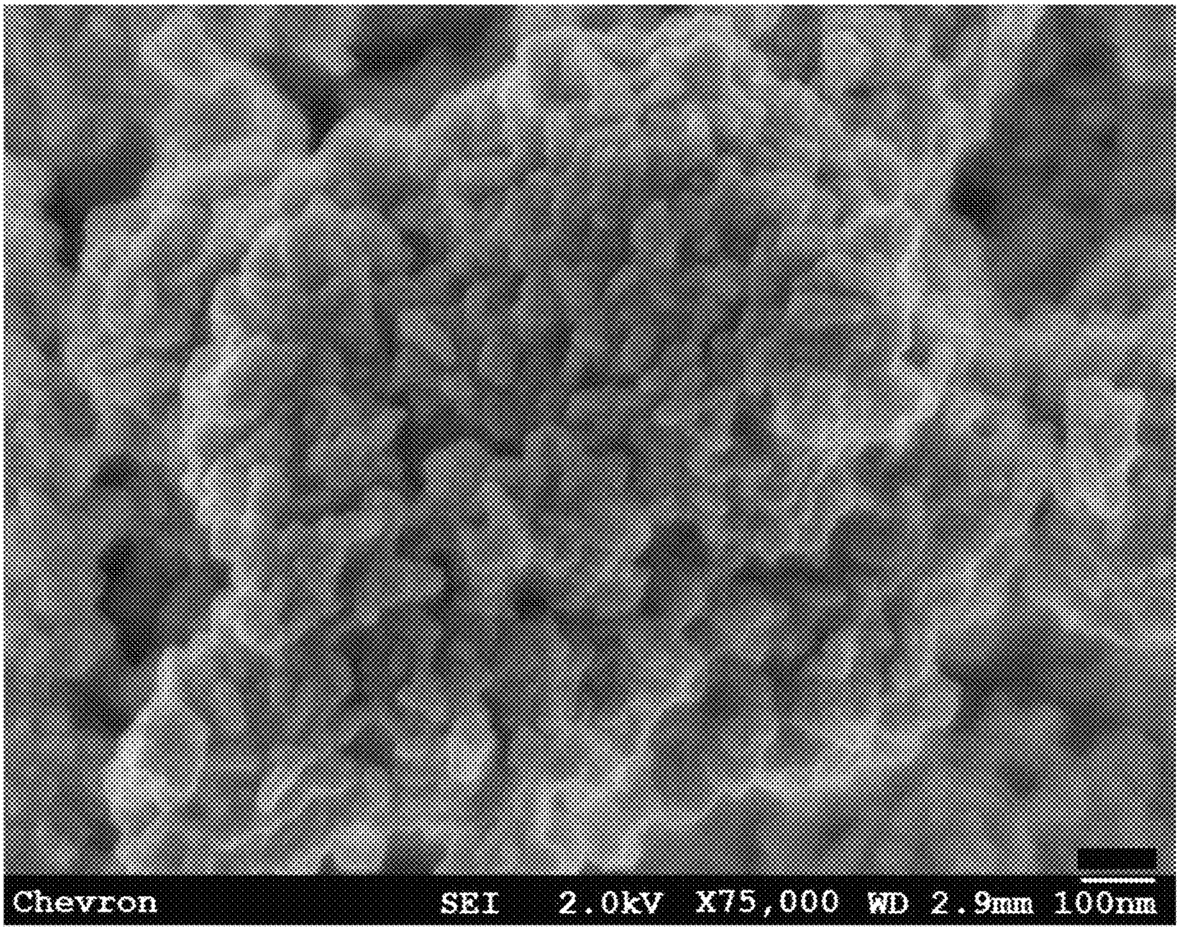
FIG. 1 shows a Scanning Electron Micrograph (SEM) image of an as-made SSZ-81 material in accordance with Example 1.

The term "sol" means a dispersion of colloidal (i.e., particle diameter less than one micrometer) solid particles within a liquid.

The term "as-made" refers to a zeolite in its form after crystallization, prior to removal of the structure directing agent.

Synthesis of the Molecular Sieve

An SSZ-81 zeolite can be synthesized by: (1) forming a reaction mixture comprising: (a) an alumina-coated silica sol; (b) a source of an alkali metal [M]; (c) a structure directing agent [Q] comprising one or more of 1,5-bis(N-methylpiperidinium)pentane dications and 1,5-bis(1-azonia-bicyclo[2.2.2]octane)pentane dications; (d) a source of hydroxide ions; and (e) water; and (2) subjecting the reaction mixture to crystallization conditions sufficient to form crystals of the zeolite.

The reaction mixture can have a composition, in terms of molar ratios, within the ranges set forth in Table 1:

TABLE 1

| | Broadest | Secondary |
|---|---|---|
| $SiO_2/Al_2O_3$ | 20 to 80 | 25 to 50 |
| $M/SiO_2$ | 0.05 to 0.30 | 0.10 to 0.30 |
| $Q/SiO_2$ | 0.05 to 0.30 | 0.05 to 0.20 |
| $OH/SiO_2$ | 0.10 to 0.80 | 0.10 to 0.60 |
| $H_2O/SiO_2$ | 10 to 60 | 15 to 40 |

Alumina-coated silica sols are available in a number of different $SiO_2/Al_2O_3$ molar ratios (e.g., 35, 80, 100, 127) from Nalco (Naperville, Illinois). The alumina-coated silica sol can comprise two or more alumina-coated silica sols. Typically, the two or more alumina-coated silica sols are materials having different $SiO_2/Al_2O_3$ molar ratios. The alumina-coated silica sol can be used as the sole or predominant source of silicon and aluminum in the reaction mixture.

The alkali metal [M] can be lithium, sodium, potassium, rubidium, cesium, or any combination thereof. The alkali metal is preferably sodium, potassium, or a mixture of sodium and potassium. Suitable alkali metal sources include alkali metal hydroxides, such as sodium hydroxide or potassium hydroxide.

The structure directing agent [Q] comprises one or more of 1,5-bis(N-methylpiperidinium)pentane dications and 1,5-bis(1-azonia-bicyclo[2.2.2]octane)pentane dications, represented by the following structures (1) and (2), respectively:

(1)

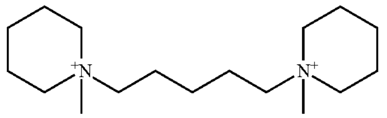

(2)

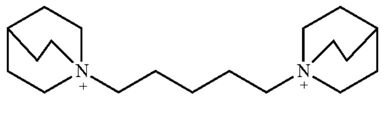

Suitable sources of Q include the hydroxides, chlorides, bromides, and/or other salts of the relevant diquaternary ammonium compounds.

The reaction mixture can further comprise seed crystals of a crystalline molecular sieve material, such as SSZ-81, from a previous synthesis. The amount of seed crystals is not particularly limited and typically corresponds to 0.1 to 25 wt. % (e.g., 0.1 to 10 wt. %), based on a total weight of silica in the reaction mixture. Seeding can be advantageous in decreasing the time necessary for complete crystallization to occur and/or to minimize the formation of other crystalline impurities.

The reaction mixture components can be supplied by more than one source. Also, two or more reaction mixture components can be provided by one source.

The reaction mixture can be prepared by any conceivable means, wherein mixing by agitation is preferred, preferably by means of stirring. The reaction mixture can be prepared in batch, continuous, or semi-continuous mode.

The reaction mixture can be in the form of a solution, a colloidal dispersion (colloidal sol), gel, or paste, with a gel being preferred.

Crystallization and Post-Synthesis Treatment

Crystallization of the zeolite from the reaction mixture may be carried out under static or stirred conditions in a suitable reactor vessel, such as for example, polypropylene jars or Teflon lined or stainless steel autoclaves placed in a convection oven maintained at a temperature of from 100° C. to 200° C. (e.g., 140° C. to 180° C.) for a period of time sufficient for crystallization to occur (e.g., about 1 day to 21 days, or about 5 days to 15 days). Preferably, the crystallization is carried out under autogenous pressure, preferably in an autoclave.

Once the desired zeolite crystals have formed, the solid product can be separated from the reaction mixture by standard mechanical separation techniques such as centrifugation or filtration. The recovered crystals are water-washed and then dried, for several seconds to a few minutes (e.g., 5 seconds to 10 minutes for flash drying) or several hours (e.g., 4 hours to 24 hours for oven drying at 75° C. to 150° C.), to obtain the as-made zeolite crystals. The drying step can be performed under vacuum or at atmospheric pressure.

As a result of the crystallization process, the recovered crystalline zeolite product contains within its pores at least a portion of the structure directing agent used in the synthesis.

The as-made zeolite may further be subjected to thermal treatment, ozone treatment, or other treatments to remove all or part of the structure directing agent used in its synthesis. Thermal treatment (e.g., calcination) may be carried out in any manner conventionally known in the art. For example, the as-made zeolite can be calcined at a temperature of from 300° C. to 800° C. (e.g., 400° C. to 650° C.) for a period of time ranging from 1 hour to 10 hours (e.g., 3 hours to 6 hours). In addition, the calcination is generally carried out in an oxygen-containing atmosphere, such as air or oxygen atmosphere.

SSZ-81 synthesized by the methods described include one or more extra-framework alkali metal cations (e.g., $Na^+$). Usually, it is desirable to remove the extra-framework alkali metal cation from the zeolite by ion exchange or other known techniques and replace it with hydrogen, ammonium, or any desired metal ion. Particularly preferred cations are those which tailor the catalytic activity for certain organic conversion reactions. These include hydrogen, rare earth metals and metals of Groups 2 to 15 of the Periodic Table of the Elements. The amount of metal can be in a range of from 0.001 to 20% by weight (e.g., 0.01 to 10% by weight, or 0.1 to 5.0% by weight) of catalyst.

Characterization of the Molecular Sieve

SSZ-81 synthesized by the methods described herein can have a $SiO_2/Al_2O_3$ molar ratio in a range of from 10 to 60 (e.g., 10 to 50, or 10 to 40, or 10 to 35, or 20 to 60, or 20 to 50, or 20 to 40, or 25 to 60, or 25 to 50, or 25 to 40, or 25 to 35). The $SiO_2/Al_2O_3$ molar ratio of zeolites may be determined by conventional analysis.

SSZ-81 crystals, prepared as described herein, can have a d50 crystal size that is 250 nanometers or less (e.g., 200 nanometers of less, 100 nanometers or less, from 20 to 250 nanometers, from 20 to 200 nanometers, or from 20 to 100 nanometers). More preferably, SSZ-81 crystals have a d90 crystal size that is 250 nanometers or less, (e.g., 200 nanometers or less, or 100 nanometers or less, from 20 to 250 nanometers, from 20 to 200 nanometers, or from 20 to 100 nanometers). SSZ-81 crystals may have both a d50 and a d90 value as described above.

The crystal size is based on individual crystals. Crystal size is the length of longest diagonal of the three-dimensional crystal. Direct measurement of the crystal size can be performed using microscopy methods, such as SEM and TEM. For example, measurement by SEM involves examining the morphology of materials at high magnifications (typically 1000× to 100,000×). The SEM method can be performed by distributing a representative portion of the molecular sieve powder on a suitable mount such that individual particles are reasonably evenly spread out across the field of view at 1000× to 100,000× magnification. From this population, a statistically significant sample of random individual crystals (e.g., 50-200) are examined and the longest diagonal of the individual crystals are measured and recorded. (Particles that are clearly large polycrystalline aggregates should not be included the measurements.) Based on these measurements, the d50 and d90 of the sample crystal sizes is calculated.

The synthesis methods described herein can produce SSZ-81 crystals with a high degree of purity, and preferably are pure phase. As used herein, the term "pure phase" means that the SSZ-81 zeolite composition can comprise at least 95% by weight (e.g., at least 97% by weight or at least 99% by weight) of zeolite with SSZ-81 framework structure, based on the total weight of the composition, as determined by powder XRD or NMR, or by other known methods for such determination. The remainder of the composition is non-SSZ-81 material which can include amorphous material, different crystalline phases, different framework types, or any combination thereof.

The powder X-ray diffraction data reported herein were collected by standard techniques using copper K-alpha radiation. Minor variations in the diffraction pattern can result from variations in the mole ratios of the framework species of the particular sample due to changes in lattice constants. In addition, sufficiently small crystals will affect the shape and intensity of peaks, leading to significant peak broadening. Minor variations in the diffraction pattern can also result from variations in the organic compound used in the preparation. Calcination can also cause minor shifts in the XRD pattern. Notwithstanding these minor perturbations, the basic crystal lattice structure remains unchanged.

Uses of Small Crystal SSZ-81 Zeolite

Small crystal SSZ-81 zeolite (wherein part or all of the structure directing agent is removed) may be used as an adsorbent or as a catalyst to catalyze a wide variety of organic compound conversion processes. Examples of chemical conversion processes, which are effectively catalyzed by the SSZ-81 zeolites described herein, either alone or in combination with one or more other catalytically active substances (including other crystalline catalysts), include those requiring a catalyst with acid activity. Examples of organic conversion processes which may be catalyzed by the SSZ-81 zeolites described herein include cracking, hydrocracking, disproportionation, alkylation, oligomerization, and isomerization.

Small crystal SSZ-81 zeolite (wherein part or all of the structure directing agent is removed) may be incorporated with another material resistant to the temperatures and other conditions employed in organic conversion processes. Such resistant materials may be selected from active materials, inactive materials, synthetic zeolites, naturally occurring zeolites, inorganic materials or a mixture thereof. Examples of such resistant materials may be selected from clays, silica, metal oxides such as alumina, or a mixture thereof. The inorganic material may be either naturally occurring, or in the form of gelatinous precipitates or gels, including mixtures of silica and metal oxides. Use of a resistant material in conjunction with a small crystal SSZ-81 zeolite (i.e., combined therewith or present during synthesis of the as-made SSZ-81 crystal, which crystal is active) tends to change the conversion and/or selectivity of the catalyst in certain organic conversion processes. Inactive resistant materials suitably serve as diluents to control the amount of conversion in a given process so that products can be obtained in an economic and orderly manner without employing other means for controlling the rate of reaction. These materials may be incorporated into naturally occurring clays (e.g., bentonite and kaolin) to improve the crush strength of the catalyst under commercial operating conditions. The inactive resistant materials (i.e., clays, oxides, etc.) function as binders for the catalyst. A catalyst having good crush strength can be beneficial because in commercial use, it is desirable to prevent the catalyst from breaking down into powder-like materials.

Naturally occurring clays which may be composited with SSZ-81 include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite. Such clays may be used in the raw state as originally mined or initially subjected to calcination, acid treatment or chemical modification. Binders useful for compositing with SSZ-81 also include inorganic oxides selected from silica, zirconia, titania, magnesia, beryllia, alumina, or a mixture thereof.

Small crystal SSZ-81 zeolite (wherein part or all of the structure directing agent is removed) may be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia, and silica-magnesia-zirconia.

The relative proportions of the SSZ-81 zeolite and inorganic oxide matrix may vary widely, with the SSZ-81 zeolite content ranging from 1 to 90% by weight (e.g., 2 to 80% by weight) of the composite.

EXAMPLES

The following examples are illustrative and are intended to be non-limiting.

Example 1

Synthesis of Small Crystal SSZ-81

The following components were added in order to a Teflon liner: 0.73 g deionized water, 0.25 g NaOH (50% solution), 5.20 g 1,5-bis(N-methylpiperidinium)pentane dihydroxide (9.23% solution), and 4.00 g Nalco aluminosilicate sol ($SiO_2/Al_2O_3$ molar ratio=35; 25 wt. % solids in water). The final molar ratio of the gel was 1 $SiO_2$/0.0286 $Al_2O_3$/0.20 NaOH/0.1 SDA/30 $H_2O$. The liner was sealed in a stainless steel autoclave and synthesized in a 160° C. oven with rotation at 43 rpm for 10 days. After crystallization, the solid product was isolated by filtration, washed with excess deionized water, and dried in a 95° C. oven.

A SEM image of the as-made product is shown in FIG. 1.

The as-made product had a $SiO_2/Al_2O_3$ molar ratio of 28, as determined by inductively coupled plasma atomic emission spectroscopy (ICP-AES).

A sample of the as-made product was calcined to 550° C. in flowing air for 5 hours to remove the structure directing agent using standard calcination protocol.

Figure 2:
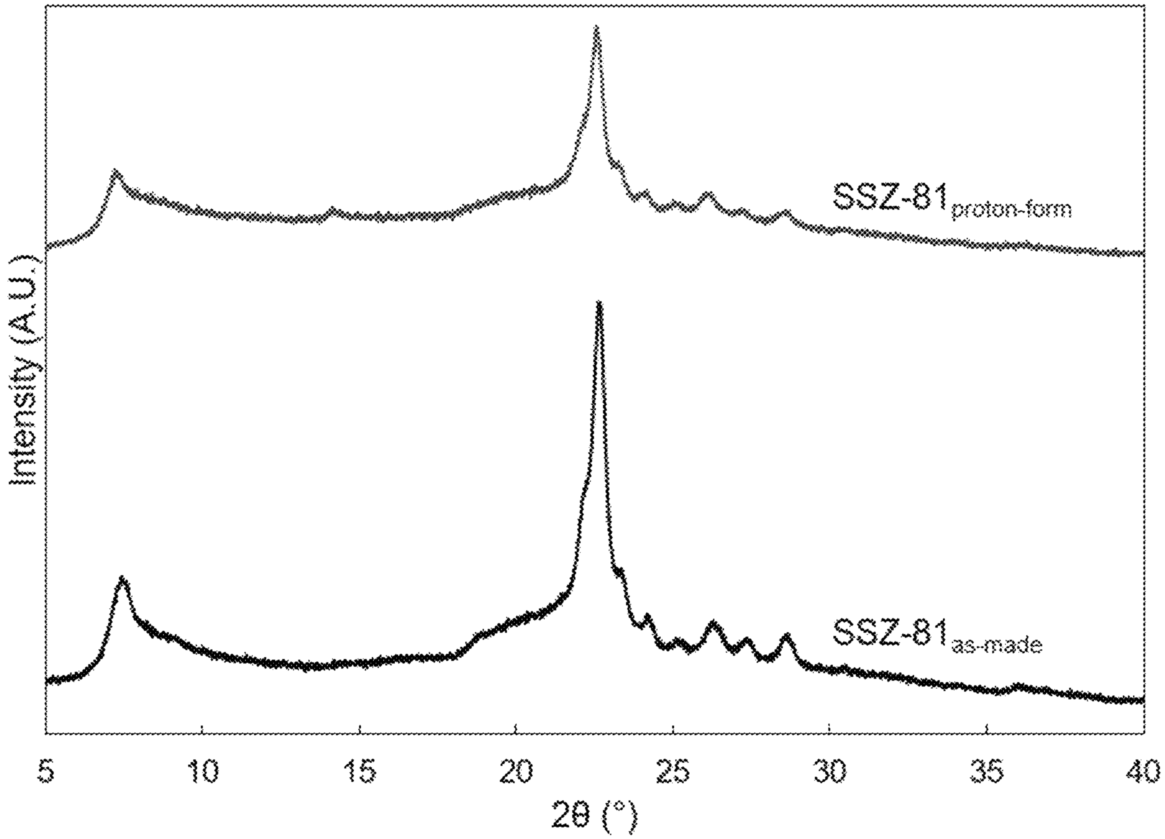
FIG. 2 shows a powder X-ray diffraction (XRD) pattern for as-made SSZ-81 (bottom) and calcined SSZ-81 (top) materials of Example 1.
Figure 3:
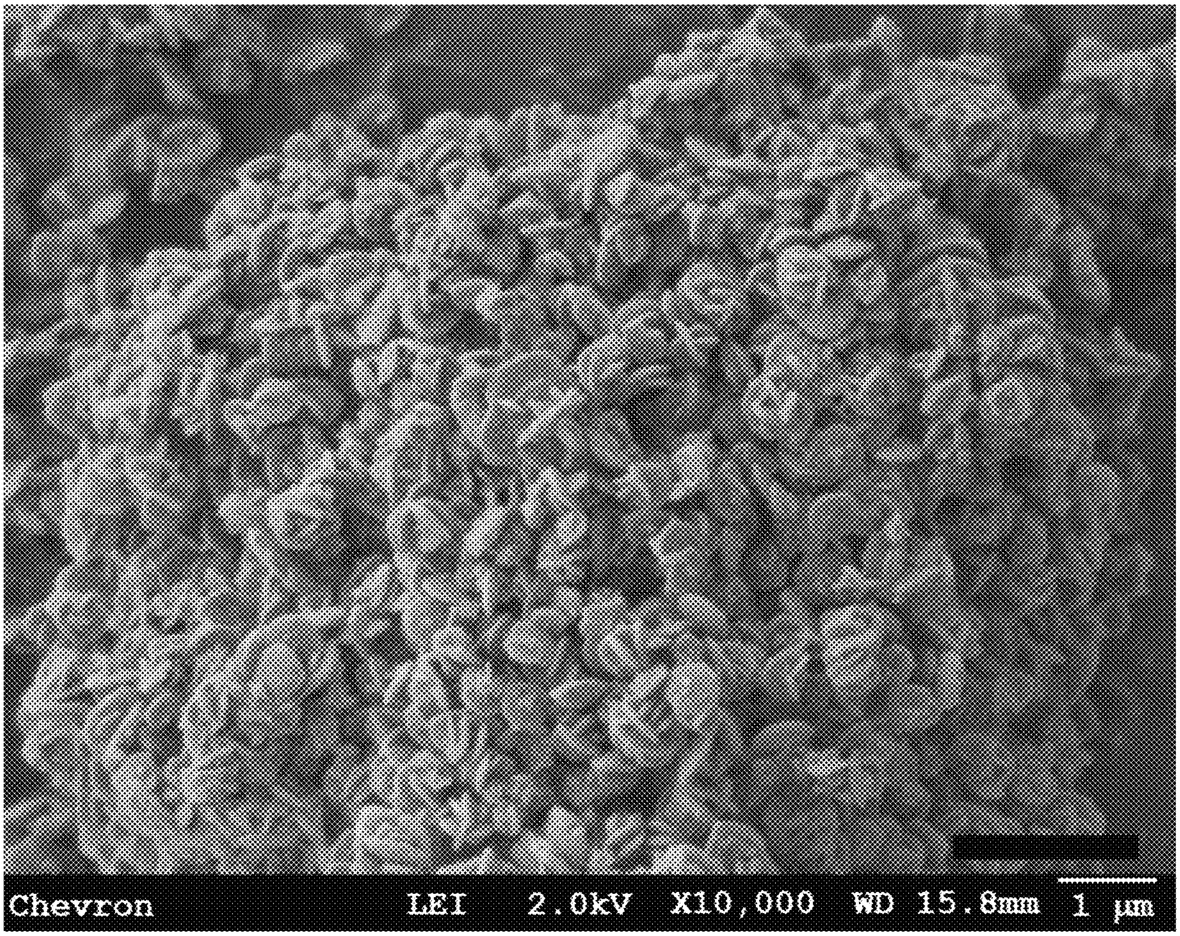
FIG. 3 shows a SEM image of an as-made SSZ-81 material in accordance with Example 4.

Analysis of the both the as-made and calcined products by powder XRD (FIG. 2) indicated that both of these products were SSZ-81.

A sample of the calcined material was then ion-exchanged to the $NH_4$-form by heating in a solution of ammonium nitrate (typically, 1 g $NH_4NO_3$/1 g zeolite in 10 mL deionized water at 95° C. for at least 2 hours). The zeolite was then filtered. This was repeated twice for a total of 3 exchanges. The zeolite was washed with deionized water to a conductivity of less than 50 μS/cm and dried in air at 95° C. The resulting $NH_4$-form zeolite was converted to the H-form by calcination using standard calcination protocol.

Analysis by n-propylamine temperature-programmed desorption showed that the product had an acid site density of 495 μmol $H^+$/g.

Analysis of nitrogen physisorption data by the t-plot method showed that the product had an external surface area of 169 $m^2$/g and a micropore volume 0.20 $cm^3$/g.

The chemical and physical properties of the product are summarized in Table 2.

Example 2

Synthesis of Small Crystal SSZ-81

The following components were added in order to a Teflon liner: 0.97 g deionized water, 0.25 g NaOH (50% solution), 5.00 g 1,5-bis(1-azonia-bicyclo[2.2.2]octane)pentane dihydroxide (10.36% solution), and 4.00 g Nalco alumina-coated silica sol ($SiO_2/Al_2O_3$ molar ratio=35; 25 wt. % solids in water). The final molar ratio of the gel was 1 $SiO_2$/0.0286 $Al_2O_3$/0.20 NaOH/0.1 SDA/30 $H_2O$. The liner was sealed in a stainless steel autoclave and synthesized in a 160° C. oven with rotation at 43 rpm for 10 days. After crystallization, the solid product was isolated by filtration, washed with excess deionized, and dried in a 95° C. oven. The product was identified by powder XRD to be pure-phase SSZ-81.

The chemical and physical properties of the product are reported in Table 2.

Example 3

Synthesis of Small Crystal SSZ-81

The following components were added in order to a Teflon liner: 0.88 g deionized water, 0.40 g KOH (45% solution), 5.00 g 1,5-bis(1-azonia-bicyclo[2.2.2]octane)pentane dihydroxide (10.36% solution), and 4.00 g Nalco alumina-coated silica sol ($SiO_2/Al_2O_3$ molar ratio=35; 25 wt. % solids in water). The final molar ratio of the gel was 1 $SiO_2$/0.0286 $Al_2O_3$/0.20 KOH/0.1 SDA/30 $H_2O$. The liner was sealed in a stainless steel autoclave and synthesized in a 160° C. oven with rotation at 43 rpm for 10 days. After crystallization, the solid product was isolated by filtration, washed with excess deionized, and dried in a 95° C. oven. The product was identified by powder XRD to be pure-phase SSZ-81.

The chemical and physical properties of the product are reported in Table 2.

Example 4 (Comparative)

Synthesis of Conventional SSZ-81

Example 4 was prepared in accordance with Example 1 of U.S. Pat. No. 8,540,963.

3.15 g 1,5-bis(1-azonia-bicyclo[2.2.2]octane)pentane dihydroxide (10.36% solution) was added to a Teflon container. Next, 0.18 g of aluminosilicate zeolite Y-52 (Union Carbide Corporation), 0.12 g NaOH (50% solution) and 3.75 g deionized water were added to the container. Finally, 0.50 g CAB-O-SIL® M-5 fumed silica (Cabot Corporation) was slowly added and the gel was thoroughly mixed. The final molar ratio of the gel was 1 $SiO_2$/0.0385 $Al_2O_3$/0.20 NaOH/0.1 SDA/35 $H_2O$. The Teflon liner was then capped and sealed within a steel Parr autoclave. The autoclave was placed on a spit within a convection oven at 160° C. The autoclave was tumbled at 43 rpm over the course of 14 days in the heated oven. The autoclave was then removed and allowed to cool to room temperature. The solids were then recovered by filtration and washed thoroughly with deionized water. The solids were allowed to dry at room temperature.

The product was identified by powder XRD to be pure-phase SSZ-81.

The chemical and physical properties of the product are reported in Table 2.

TABLE 2

Physical and Chemical Properties of SSZ-81 Materials

| | Ex. 1 | Ex. 2 | Ex. 3 | Ex. 4 |
|---|---|---|---|---|
| Approximate crystal size [nm] | 25-50 | 25-75 | 25-75 | 500 |
| As-Made Material | | | | |
| $SiO_2/Al_2O_3$ molar ratio | 28 | 30 | 30 | 29 |

TABLE 2-continued

Physical and Chemical Properties of SSZ-81 Materials

| | Ex. 1 | Ex. 2 | Ex. 3 | Ex. 4 |
|---|---|---|---|---|
| Calcined Material | | | | |
| $SiO_2/Al_2O_3$ molar ratio | 32 | 35 | 34 | 34 |
| Acid Site Density [μmol/g] | 495 | 357 | 480 | 578 |
| Micropore Volume [$cm^3$/g] | 0.20 | 0.19 | 0.19 | 0.21 |
| External Surface Area [$m^2$/g] | 169 | 225 | 203 | 82 |

The invention claimed is:

1. A method of making a zeolite having a framework structure of SSZ-81, the method comprising:
- (1) forming a reaction mixture comprising:
  - (a) an alumina-coated silica sol;
  - (b) a source of an alkali metal [M];
  - (c) a structure directing agent [Q] comprising 1,5-bis (N-methylpiperidinium) pentane dications;
  - (d) a source of hydroxide ions; and
  - (e) water; and
- (2) subjecting the reaction mixture to crystallization conditions sufficient to form crystals of the zeolite.

2. The method of claim 1, wherein the alkali metal comprises sodium, potassium, or a mixture of sodium and potassium.

3. The method of claim 1, wherein the crystallization conditions include heating the reaction mixture under autogenous pressure at a temperature of from 100° C. to 200° C.

4. The method of claim 1, wherein the reaction mixture has a composition, in terms of molar ratios, as follows:

| | |
|---|---|
| $SiO_2/Al_2O_3$ | 20 to 80 |
| $M/SiO_2$ | 0.05 to 0.30 |
| $Q/SiO_2$ | 0.05 to 0.30 |
| $OH/SiO_2$ | 0.10 to 0.80 |
| $H_2O/SiO_2$ | 10 to 60. |

5. The method of claim 1, wherein the reaction mixture has a composition, in terms of molar ratios, as follows:

| | |
|---|---|
| $SiO_2/Al_2O_3$ | 25 to 50 |
| $M/SiO_2$ | 0.10 to 0.30 |
| $Q/SiO_2$ | 0.05 to 0.20 |
| $OH/SiO_2$ | 0.10 to 0.60 |
| $H_2O/SiO_2$ | 15 to 40. |

6. The method of claim 1, wherein the zeolite has a d50 crystal size of 250 nanometers or less.

7. The method of claim 1, wherein the zeolite has a d90 crystal size of 250 nanometers or less.

* * * * *